2,412,368

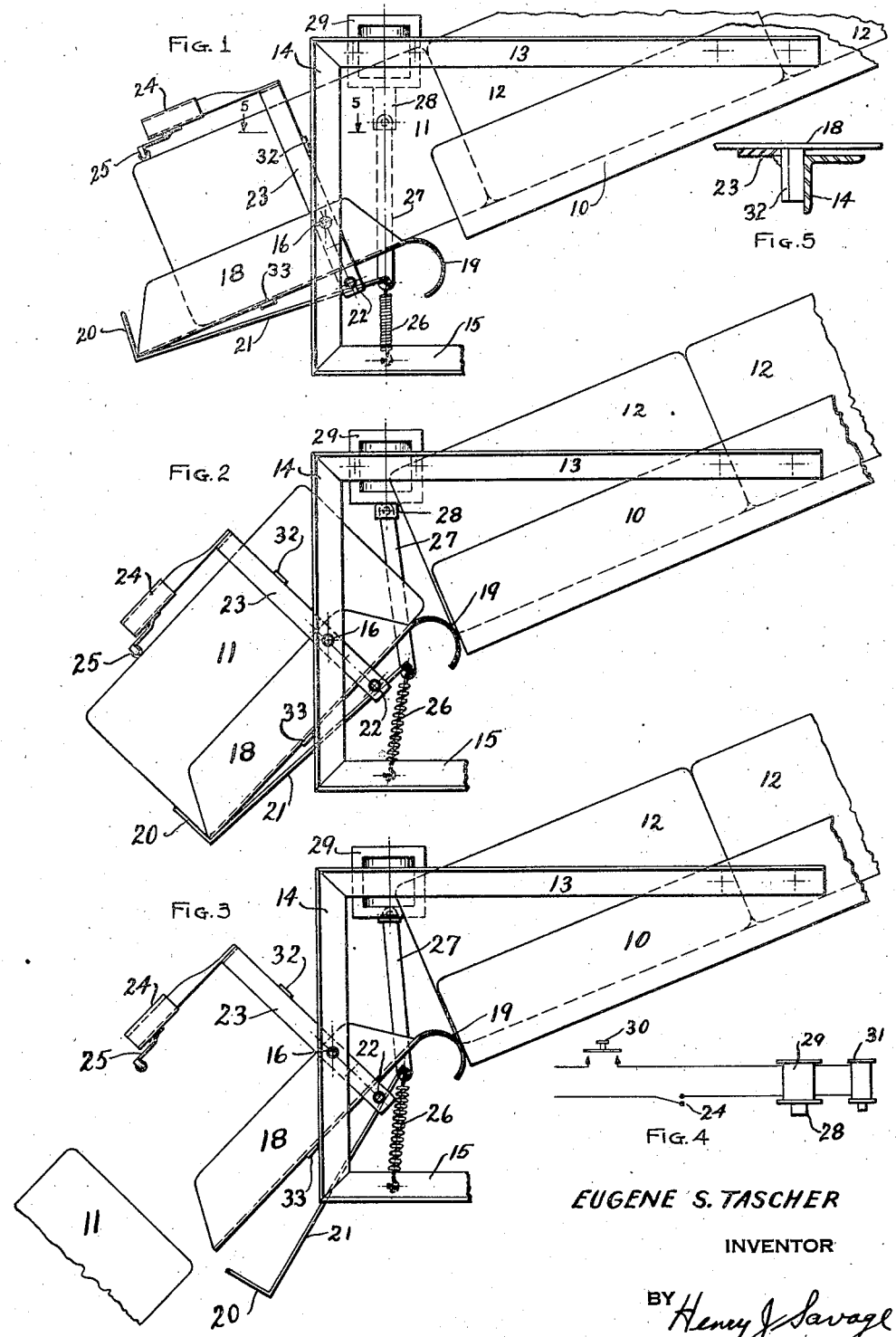
Dec. 10, 1946. E. S. TASCHER 2,412,368
PACKAGE DELIVERY CHUTE
Filed Feb. 1, 1945
EUGENE S. TASCHER
INVENTOR
BY Henry J. Savage
ATTORNEY Patented Dec. 10, 1946

UNITED STATES PATENT OFFICE 2,412,368

PACKAGE DELIVERY CHUTE

Eugene S. Tascher, Ingleside, Ill., assignor to National Biscuit Company, New York, N. Y., a corporation of New Jersey Application February 1, 1945, Serial No. 575,700

8 Claims. (Cl. 193—40)

My invention relates to a package delivery chute and has for one of its objects to produce a delivery chute which will deliver with certainty and without damage the lower or first package from a line or stream of packages that are supplied more or less continuously to its upper end.

At warehouses, factories, stations and other places where trucks or cars are loaded with merchandise, the merchandise in containers and packages is fed by hand or by a conveyor to the upper end of a chute or chutes leading to the loading platform. At the delivery end, the lowest package is removed for loading and the next following package moves down to take its place. The pressure of the following packages against the lowest one, which has been stopped by a block or abutment, is so great that the wrapper of the lowest bundle or package often is damaged while being removed.

An important object of my invention is to provide means for preventing pressure of the following packages against the lowest package when it comes to rest at the delivery end of the chute so that it can be removed easily and without damage.

Another object is to provide means actuated or controlled by the lowest package whereby the number of packages taken from the delivery end of the chute will be counted accurately and automatically.

Another object is to simplify and expedite the transfer of merchandise in packages, bundles, containers and the like to, from or within stores, cars, trucks, warehouses, factories, depots, and the like.

In the accompanying drawing to which reference is made, I have illustrated one form of my invention by which I attain the foregoing and other objects and advantages.

Fig. 1 is a side elevation of the lower end of a delivery chute, with the leading package or bundle at the neutral point where its further advance will trip the abutment and stop the following packages.

Fig. 2 shows the abutment tripped and the leading package released from pressure of the following packages.

Fig. 3 shows the package removed from the abutment, which is now ready to return to the position shown in Fig. 1, ready to receive the next package.

Fig. 4 is a wiring diagram for tripping the control solenoid and counter.

Fig. 5 is an enlarged detail, in section on line 5—5 of Fig. 1, showing one of the stops for the tilting extension.

In the drawing, 10 indicates a chute, which may be one of a multiple series arranged either horizontally or vertically, down which packages 11, 12 slide that are delivered, more or less continually, to the upper end of the chute, either by hand or from a conveyor. The chute will be inclined at the angle at which it best delivers the parcels. I have found an angle of 22½ degrees to be satisfactory in most cases, but this angle will vary depending upon the speed desired, fragility of the articles, roughness, and other factors. It is supported on a frame which may be made from angles 13, 14, 15 or other shapes secured together, as by welding or other means. At a suitable place adjacent the delivery end of the chute, as on the frame member 14, there is pivoted at 16 a tiltable extension which comprises a slide 18 that is open at both ends, and at its rear or entrant end is curved downward to form a rounded stop or abutment 19. At its front or delivery end, the slide is controlled by a gate 20 secured to an arm 21 that is pivoted at 22 to a yoke 23. The yoke is secured to both sides of the slide and forms an arch through which the packages 11, 12 pass. This yoke carries a switch 24 having a movable contact 25 that extends into the path of the package 11 where it will be engaged by the forward edge of the package, and the circuit, of which it is a part, closed at just about the time the package 11 has reached the point of unstable equilibrium with respect to the pivot point 16.

The arm 21 extends beyond the pivot 22 and is connected to a spring 26 and a link 27, the upper end of which is connected to the core 28 of a solenoid 29 that is in the circuit with the switch 24. The lower end of spring 26 is connected to any convenient fixed member, as the frame member 15.

As the package continues to advance beyond the position shown in Fig. 1, the entire extension tilts about the pivot 16 raising the stop 19 into the path of the next following package 12 which it stops, as shown in Fig. 2. The package 11 continues to slide forward on the slide 18 until it comes to rest against gate 20. The switch 24 remains closed, and the spring 26, together with the pressure of the package, keeps the gate 20 closed.

As shown in Fig. 4, the switch 24 and solenoid 29 are in a circuit that includes the pushbutton switch 30 and a second solenoid 31 which actuates a counter. The switch 30 and counter solenoid 31 may be adjacent the chute or at a central control station from which a number of chutes may be controlled and a count kept of all packages or articles delivered.

When a package on the slide rests against gate 20, as shown in Fig. 2, the switch 24 is closed. Now when the operator presses button 30 both solenoids are energized, the solenoid 29 pulling the short end of the gate arm 21 upward to open the gate so that the package 11 slides off as shown in Fig. 3, and the solenoid 31 operating the counter to register the delivery of one package or article.

When the package 11 leaves slide 18, the switch 24 is opened which breaks the circuit and deenergizes the solenoids. The weight of the core 28 and link 27 together with the pull of spring 26 return the extension to the position shown on Fig. 1 ready to receive the next package.

The stop 19 preferably is semi-circular so as to present a smooth rounded surface to the package 12, and it may be weighted so that the extension is balanced on its pivot 16 when in the position of Fig. 1. The center from which the stop 19 is struck is substantially in line with the bottom of the packages on the chute 10 when the extension is in delivery position, so that pressure of the package on it has no tendency to tilt the extension. However, as soon as the extension starts its return movement, the package exerts downward pressure on the stop to assist its return to the position of Fig. 1. Lugs 32, 33 limit movement of the extension by striking the frame member 14.

I have shown the switch 24 mounted on the yoke 23, but it may be secured to the slide 18 or be mounted on the fixed frame so as to be opened and closed by tilting of the slide or by contact with the package.

It will be understood therefore that while I have described the switch 24 as being closed by a package 11 as it enters on the slide 18 and before it comes to rest against the gate 20, this description is to be interpreted as including direct closing of the switch by the package and also an indirect closing through one or more intermediate members, as where tilting of the slide 18, gate arm 21, or yoke 23 may be the ultimate switch-closing member.

My invention may be embodied in many modifications of the form illustrated and be adapted to many uses.

The chute 10 may be a fixed chute, as illustrated, down which a line of the packages slide, or it may be any other suitable form of conveyor, as a continuously moving belt passing around a roller or pulley adjacent the stop 19, so that the latter, when raised, will hold the packages stationary on the belt.

I claim as my invention all such that come within the scope or intent of my claims.

My claims are:

1. In a device of the class described, the combination of a delivery chute adapted to carry a line of packages, and a pivoted inclined extension adjacent the delivery end of the chute having a slide adapted to receive the lowermost package of the line and a stop adapted to hold the next following package, the length of the slide and position of the pivotal support of the extension being such that before the lowermost package reaches the lower end of the slide it will cause the extension to tilt and raise the stop to check movement of the following packages.

2. In a device of the class described, the combination of a delivery chute adapted to carry a line of packages, and a pivoted inclined extension adjacent the delivery end of the chute, said extension having an inclined slide, a gate and a stop, said slide being adapted to receive the lowermost package from the line and the gate holding the package from sliding off from the slide, the stop being operatively connected to the upper end of the slide and in the normal position thereof being below the plane of the chute so that packages may pass over it, the length of the slide and position of the pivotal support of the extension being such that the slide is tilted by the lowermost package sliding thereon before the forward end of the package reaches the gate and before its rear end has left the chute, the tilting of the slide raising the rear end of the package thereon from the chute and raising the abutment into the path of the next following package on the chute.

3. In a device of the class described, the combination of a delivery chute adapted to carry a line of packages, and a pivoted inclined extension adjacent the delivery end of the chute, said extension having an inclined slide, a gate and a stop, said slide being adapted to receive the lowermost package from the line and the gate holding the package from sliding off from the slide, the stop being operatively connected to the upper end of the slide and in the normal position thereof being below the plane of the chute so that packages may pass over it, the pivotal support of the extension being located so that the slide is tilted by the lowermost package sliding thereon before the forward end of the package reaches the gate and before its rear end has left the chute, tilting of the slide raising the rear end of the package thereon from the chute and raising the stop into the path of the next following package on the chute, and means controlled in part by entry of a package on to the slide for opening the gate to permit the package to slide from the slide when the latter has been tilted and the stop raised.

4. In a device of the class described, the combination of a delivery chute for a row of packages; a pivoted slide adjacent the lower end of the chute adapted to receive the lowermost package of the row; a gate blocking the lower end of the slide and holding the package thereon; a stop connected to the upper end of the slide and normally being below the path of the packages on the chute; said slide, gate and stop being arranged to be tilted as a unit by a package entering upon the slide from the chute, the pivotal support of the slide being located so that the unit will be tilted before the forward end of the package entering thereon from the chute reaches the gate, whereby the stop will be raised into the path of the next following package on the chute.

5. In a device of the class described, the combination of the delivery end of a conveyor for a row of packages, a tiltable slide adapted to receive the leading package from the row on the conveyor, a gate extending across said slide to hold the package thereon, an abutment associated with said slide and adapted to be moved into and out of the path of the packages on said conveyor, a solenoid connected when energized to open said gate to release the package on the slide, a switch in the solenoid circuit, said slide being tilted by the entry of a package thereon to raise the abutment into the path of the next following package on the conveyor, and means for closing said switch when the leading package is on the slide in position to cause the latter to tilt.

6. In a device of the class described, the combination of a frame, an inclined slide pivoted thereon, stops for limiting movement of the slide in both directions, means for supplying a package to the upper end of said slide, said slide being tiltable by said package to raise its upper end and lower its lower end, an abutment raised by tilting of the slide to block its upper end against entry of another package, a gate at the lower end of the slide holding the package thereon, a solenoid connected to open said gate when energized, means to energize said solenoid to open the gate and release the package when the slide has been tilted by the package, and means for returning the slide and gate and withdrawing the abutment from its blocking position.

7. In a device of the class described, the combination of a frame, an inclined slide pivoted thereon, means for supplying a package to the upper end of said slide, said slide being pivoted at such a point that the package will tilt it before fully thereon, a gate closing the lower end of the tilted slide to hold the package thereon, a switch carried by said slide in position to be closed by the package thereon, means operable when said switch is closed to open the gate to release the package, and means for reclosing the gate and returning the slide to position to receive another package.

8. In a device of the class described, the combination of a delivery chute adapted to carry a line of packages, an inclined slide pivotally supported adjacent the delivery end thereof and adapted to receive the leading package therefrom, said slide being pivoted so that it will be tilted by entry of a package thereon, a gate closing the lower end of the slide to hold the package thereon, an abutment connected to operate upon tilting of said slide to block forward movement of the next following package on the chute, an electric circuit including a package operated switch that is closed by entry of a package on the slide and a manually operated switch, a counter and a solenoid in said electric circuit adapted to be actuated when both switches are closed, said solenoid being connected to open said gate and release the package thereon when energized by the closing of both switches, the release of the package from the slide opening said package operated switch and de-energizing the solenoid, and means for closing the gate and returning the slide to receive the next package from the chute when said package operated switch is opened.

EUGENE S. TASCHER.